July 21, 1970    D. T. N. WILLIAMSON    3,521,525

MACHINE TOOLS

Filed May 21, 1968

Inventor

David T. N. Williamson

BY Watson, Cole, Grindle & Watson
Attorneys

United States Patent Office 3,521,525
Patented July 21, 1970

1

3,521,525
MACHINE TOOLS
David T. N. Williamson, Deptford, London, England, assignor to Molins Machine Company Limited, London, England, a corporation of Great Britain
Filed May 21, 1968, Ser. No. 730,755
Claims priority, application Great Britain, May 31, 1967, 25,135/67
Int. Cl. B23c 1/00; B27g 23/00; B26d 1/12
U.S. Cl. 90—11                                           16 Claims

ABSTRACT OF THE DISCLOSURE

Setting the cutting edge of a cutting tool in known relationship to the tool holding means of a machine tool by moving the tool loosely gripped in the tool holding means towards a fixed reference element attached to the machine tool or the workpiece carrier, setting the relationship by abuttal of a datum surface on the tool against the reference element and closing the tool holding means to grip the cutting tool.

This invention concerns improvements in or relating to machine tools and in particular to a method of and apparatus for locating a cutting tool in a numerically-controlled machine tool.

In U.S. Pat. No. 3,241,451 and Re. 25,956 there is disclosed a method of and apparatus for locating a cutting tool in a numerically-controlled machine tool in which a tool-gripping means is moved into a position confronting a datum surface at a desired distance therefrom with the shank of the tool loosely gripped by said means during at least a final part of such movement, and said means is thereafter caused to grip said shank firmly while said means is in said position and the free end of the tool abuts the datum surface. The datum surface described in the above mentioned specification is provided by a pad against which the cutting end of the tool abuts to accurately locate the tool in a quill or spindle ready for a machining operation.

It may happen that during a machining operation the cutting edge of a tool picks up metal particles which adhere to the cutting tool, and there is therefore the possibility that a tool which has been used for a machining operation and is about to be used for a further machining operation may have metal particles adhering to and projecting from its cutting end. If the tool is then abutted against a datum pad, as explained above, to accurately locate it prior to said further machining operation, there is the possible risk that the projecting metal particles will render the location of the tool inaccurate through being interposed between the datum pad and the end of the tool which it is intended should abut the datum pad.

According to the present invention there is provided a method of locating a cutting tool in a cutting tool holding member in a numerically-controlled machine tool, comprising the steps of providing the cutting tool with a datum surface at a predetermined distance from the cutting edge of the tool, providing in the machine tool a datum element having an end which can abut said surface, placing the shank of the tool in the tool-holding member and causing relative movement between the tool-holding member and the datum element until the tool-holding member is a predetermined distance from the end of the datum element and the datum surface abuts the datum element and positions the tool in the tool-holding means, and causing the tool shank to be gripped in the tool-holding member at that position.

Further according to the present invention there is provided a numerically-controlled machine tool comprising

2 a cutting tool-holding member, means for supporting a workpiece in a position in which it is opposed to the tool-holding member, tool-gripping means associated with said member and operable to close on to and grip the shank of a cutting tool after the cutting tool has been positioned in the tool-holding member, means to produce relative movement between the workpiece and the tool-holding member for the cutting tool to effect a machining operation, a datum element having an end, and means to move said tool-holding member towards said datum element to a predetermined distance therefrom so that the end of the datum element can abut a datum surface on the tool a predetermined distance from the cutting edge of the tool and move the tool relative to the tool-holding member so that the tool is positioned in the tool-holding member with its cutting edge a predetermined distance from the end of the tool-holding member.

Said datum element may be mounted on a pallet to which a workpiece to be machined is fixed and which is fed into the machine tool for a machining operation. Alternatively the datum element may be mounted at a convenient position on the machine tool.

The invention therefore further provides a pallet for use in a numerically-controlled machine tool and to which a workpiece to be machined in the machine tool can be fixed, the machine tool having a cutting tool-holding member, the pallet having mounted thereon a datum element which can abut a datum surface on a cutting tool in the tool-holding member to enable the cutting tool to be positioned in the tool-holding member.

The present invention further provides a cutting tool for use in a numerically-controlled machine tool having a datum surface at a predetermined distance from the cutting edge of the tool.

Other features of the present invention will become apparent from the following description.

The present invention has particular advantages with respect to composite cutting tools, having inserts of brittle or frangible material, which might possibly be damaged if brought too abruptly into direct contact with the datum pad of the aforementioned specification. Such brittle cutting inserts are formed from tungsten carbide, ceramic materials, and precious and semi-precious stones e.g. diamonds. These cutting inserts are held in known manner in the cutting tool. In addition, the invention has advantages with cutting tools of large diameter e.g. face mills, the size of which is greater than a convenient size of datum pad according to the aforementioned specification.

Apparatus in accordance with the invention will now be described, by way of example, with reference to the accompanying drawings, in which:

FIGS. 1 and 2 show a cutting tool having a shank 1 and two cutting edges 2 and 3 at its forward cutting end. A recess in the form of a hole 4 having a circular flat base is provided centrally in its forward cutting end, the base of the recess being a predetermined distance (e.g. 1.00 mm.) behind the foremost parts of the cutting edges 2 and 3.

Figure 3:
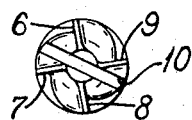
FIG. 3 is an end view of a further cutting tool.
Figure 4:
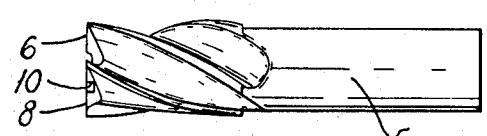
FIG. 4 is a side view of the cutting tool shown in FIG. 3.

FIG. 3 and 4 show a cutting tool having a shank 5 and four cutting edges 6, 7, 8 and 9 at its forward cutting end. A recess in the form of a slot 10 having a substantially rectangular flat base is provided in and diametrically across its forward cutting end, the base of the recess similarly being a predetermined distance (e.g. 1.00 mm.) behind the cutting edges 6, 7, 8 and 9.

Figure 1:
FIG. 1 is an end view of a cutting tool.

The bases of the recesses 4 and 10 are provided in the forward cutting ends of the tools shown in FIGS. 1 and 3 respectively by grinding, and can be re-ground when the cutting edges are re-ground to re-set said predetermined distance.

Figure 2:
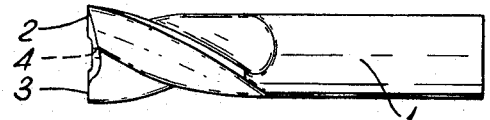
FIG. 2 is a side view of the cutting tool shown in FIG. 1.
Figure 5:
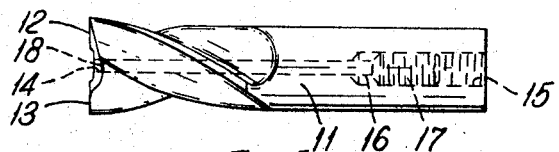
FIG. 5 is a side view of a cutting tool similar to that shown in FIG. 2 but provided with an adjustable member.

The cutting tool shown in FIG. 5 is essentially similar to that shown in FIGS. 1 and 2, having a shank 11 and two cutting edges 12 and 13 at its forward cutting end, but it has a hole 14 running centrally through the cutting tool and having a part 15 of increased diameter, and internally threaded towards the shank end. A member having a narrow rod-like portion 16 adapted to fit the narrow part of the hole 14, and an externally threaded portion 17 of increased diameter and adapted to fit in the part 15 of the hole, is provided in the cutting tool. The portion 16 has a flat forward end 18 which provides the base of the recess formed in the forward cutting end of the tool by the hole 14. By screwing the externally threaded portion 17 in the internally threaded hole 15 the distance of the flat end 18 behind the foremost part of the cutting edges 12 and 13 can be adjusted to a predetermined distance (e.g. 1.00 mm.). Thus, when the cutting edges of the tool are reground the position of the flat end 18 can be adjusted to reset said predetermined distance. By this arrangement the need to regrind the base of a small hole, as is required in the cutting tool shown in FIGS. 1 and 2, can be avoided. A locking device (not shown) is then operated.

It will be appreciated that, if desired, a similar adjustable member may be used in the cutting tool shown in FIGS. 3 and 4, the cutting tool being provided with a central hole to accommodate the rod-like portion 16 of the member.

Figure 7:
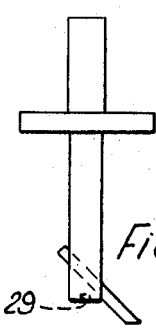
FIG. 7 shows a typical boring bar having the cutting surface angularly displaced from and extending beyond the centre spindle of the tool.

FIG. 7 shows a typical boring bar having the cutting surface laterally displaced from and extending beyond the centre spindle. The tool is set such that the cutting surface is in known relationship to the recess 29 which has a flat base adapted to abut the end of the datum element.

Figures 8, 9:
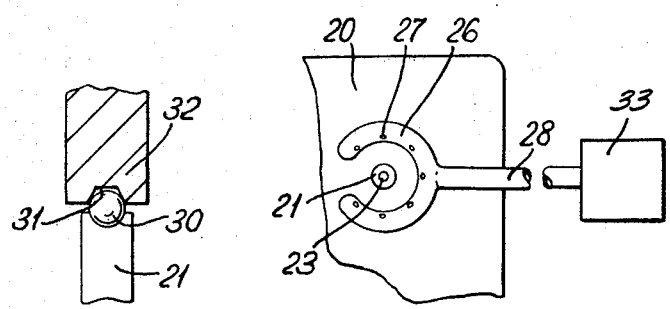
FIG. 8 shows a detail modification of FIG. 6.
FIG. 9 shows an alternative fluid arrangement having a hollow perforated yoke disposed adjacent to the datum element in the operative position.

FIG. 8 shows a modified datum element 21 having a spherical end adapted to enter the recess 31 in the tool 32 such that contact may be made between the spherical end and the recess which is in the form of a circular taper. The spherical end 30 is an insert secured in datum element 21.

Figure 6:
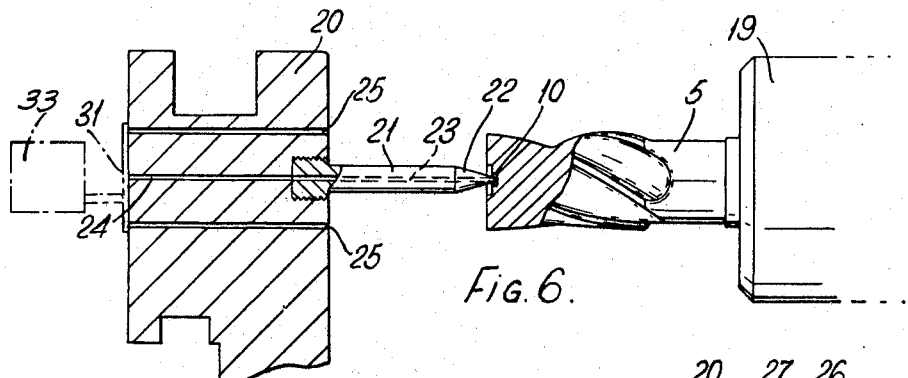
FIG. 6 is a side elevation of part of a numerically-controlled tool with a cutting tool as shown in FIG. 4, and part of a pallet with fluid passages and a datum element having a central fluid passage.

FIG. 6 shows the cutting tool of FIGS. 3 and 4 carried in a quill or spindle or tool-holding member 19 of a numerically-controlled machine tool, which is provided with devices as described in U.S. Pat. No. 3,243,178 for automatically shuffling into accurate location a pallet carrying a workpiece to be machined. Part of a pallet 20 so located in a position opposed to the tool holding member 19 is shown in FIG. 6.

Mounted on the pallet adjacent one corner thereof is a datum element 21 having a hardened conical pointed end 22 which can enter the recess in the forward cutting end of the cutting tool to abut the base of the recess. In FIG. 6 the pointed end 22 is shown abutting the base of the recess slot 10 in the cutting tool of FIGS. 3 and 4. Thus, the cutting tool 5 can be located in the tool-holding member 19 by abutment of the base of the recess against the end 22 of the datum element 21, so that the base of the recess (and hence the cutting edges which the base is a predetermined distance behind) is a predetermined distance from the tool-holding member. Since the datum element 21 is mounted on the pallet on which the workpiece to be machined is also mounted, location of the cutting tool by abutment against the datum element effects the desired location of the cutting tool 5 in the tool-holding member 19 relative to the workpiece (not shown).

The datum element 21 may have as is shown in FIG. 6 a central passage 23 extending the whole length thereof and connecting with a passage 24 in the pallet 20, the surface of which, remote from the datum element, has an area 31 adapted to contact a source of compressed air 33 by sliding contact in order to establish a substantially air tight seal. The compressed air is turned on for short periods at the approach of a cutting tool 5 towards the datum element 21 for location purposes, the jet of compressed air issuing from the central passage 23 removes any foreign matter, e.g. swarf, from the recess 10 in the forward cutting end of the cutting tool. Alternatively, or in addition, there may be provided a ring of air passages 25 passing through the pallet 20 and surrounding the datum element 21 to project jets of compressed air towards the recess in the forward cutting end of the tool 5. A diametrically-opposed pair of these passages 25 is shown in FIG. 6.

An alternative arrangement is shown in FIG. 9, in which a tubular yoke 26 is attached to a suitable position on the machine tool such that when a pallet 20 is placed into accurate location, the tubular yoke 26 is adjacent to, but does not impede the passage of the datum element 21. The tubular yoke 26 has a series of apertures 27 in its upper surface, having nozzles therein, directed towards the apex of the datum element 21 and one end 28 of the tubular yoke 26 is connected to a source of compressed air 33, while the other end or ends of the yoke are blocked. In operation the datum element 21 of a pallet 20 being offered into position for a workpiece to be machined passes into the center of the ring of apertures 27 in the tubular yoke 26, and it is arranged that when a cutting tool is caused to approach the datum element 21, a source of compressed air 33 is turned on so that the recess in the forward cutting end of the cutting tool passes through a cone formed by the concentration of the jets of compressed air issuing through the apertures 27 in the tubular yoke 26.

FIG. 9 shows also the central fluid passage in datum element 21 and this may be used in addition to the yoke 26.

It should be appreciated that the datum element is shown in the accompanying drawings as forming part of the pallet but it is within the scope of the present invention for the datum element to be fixed to a convenient position on the machine tool and this arrangement has the advantage that only one datum element is required as opposed to a plurality corresponding to the number of pallets in use. When the datum element is part of the machine tool it may be provided with a passage 23 to produce the air jet and other passages similar to passages 25 or a yoke member similar to yoke 26 may be provided adjacent to the datum element.

The tool-holding member 19 has associated tool gripping means, for example as described in the first mentioned specification, adapted on actuation to close and to grip thereby the shank of the cutting tool, and the machine tool has means to provide relative movement between the workpiece and the cutting tool to effect a machining operation.

The operation of the machine tool is essentially as described in the first mentioned specification and will therefore only be briefly described below.

When the pallet 20 is accurately located in the machine tool the tool holding member 19 is moved to collect a selected tool from a tool magazine and grip the tool by its shank. The member 19 is then moved to a position opposite the datum element 21 on the pallet and is then moved forwardly towards the datum element (to the left as viewed in FIG. 6) until it is a predetermined distance from the datum element. The compressed air source 33 is then turned on and the air jets clear any swarf from the base of the recess in the approaching cutting tool. After a short period the source of compressed air is then shut off. While the member 19 is moving forward its associated gripping means release their grip on the cutting tool shank so that the tool can move relatively to the tool-holding member. The base of the recess in the forward cutting end of the tool abuts the pointed end 22 of the datum element 21 to locate the tool relatively to the holding member as described above, and when such location is achieved the gripping means are actuated to grip the shank of the tool and hold it firmly in the holding member. The holding member 19 is then withdrawn to clear the tool from the datum element, and a machining operation is effected by causing relative movement (including rotation of the cutting tool) between the workpiece and the cutting tool. After completion of the machining operation the tool-holding member is moved to return the cutting tool to the magazine and, when appropriate, to collect a further tool for a further machining operation.

It will be appreciated that the tool of FIGS. 3 and 4 is shown in the tool-holding member 19 in FIG. 6 only by way of illustration and example, and that other cutting tools, such as those shown in FIGS. 1, 2, 5, 7 and 8 can be similarly used, the cutting tool being located relatively to the holding member by abutment of the base of the recess in the tool forward cutting end against the pointed end of the datum element 21.

It will be appreciated that when cutting tools of the types illustrated in FIGS. 7 and 8 are used, wherein the cutting edge is displaced from and is not of the same length as the centre spindle, that recesses 29 and 30 are used in order correctly to position the cutting tool in the tool holding member 19.

The conical end 22 of the datum element 21 may be pointed, as shown, or may have a suitably radiussed or a flat tip.

It will be appreciated that the datum element may, if desired, be fixed in the machine tool like the datum pads described in the first mentioned specification, instead of being mounted on the pallet which is fed into the machine tool as described above.

What I claim as my invention and desire to secure by Letters Patent is:

1. A method of locating a cutting tool in a cutting tool-holding member in a numerically-controlled machine tool, comprising the steps of; providing the cutting tool with a datum surface at a predetermined distance from the cutting edge of the tool, providing in the machine tool a datum element having an end which can abut said surface, placing the shank of the tool in the tool-holding member, generating relative movement between the tool-holding member and the datum element until the tool-holding member is a predetermined distance from the end of the datum element and the datum surface abuts the datum element to position the tool in the tool-holding means, and gripping the tool shank in the tool-holding member at that position.

2. A method as claimed in claim 1 wherein the datum surface is flat and is caused to abut the extreme end of the datum element.

3. A method as claimed in claim 1 wherein the tool is provided with a circular recess with tapered sides which constitute the datum surface, and the datum element is provided with a rounded tip which is caused to enter the recess by the relative movement until the relative movement is arrested by the rounded tip abutting the tapered sides.

4. A method as claimed in claim 1 further including the step of clearing foreign matter from the datum surface and the datum element with a jet of fluid before the datum surface abuts the datum element.

5. A numerically-controlled machine tool comprising; a cutting tool-holding member, tool-gripping means associated with said member and operable to close onto and grip the shank of a cutting tool after the cutting tool has been positioned in the tool-holding member, a datum element having a male end, said tool-holding member being movable towards said datum element to a predetermined distance therefrom so that the end of the datum element can abut a datum surface on the tool a predetermined distance from the cutting edge of the tools and move the tool relative to the tool-holding member so that the tool is positioned in the tool-holding member with its cutting edge a predetermined distance from the end of the tool-holding member.

6. A numerically-controlled machine tool as claimed in claim 5 and further comprising means to produce a jet of fluid directed towards the end of the datum element and the datum surface on the tool to remove foreign matter therefrom.

7. A numerically-controlled machine tool as claimed in claim 6 wherein the means to produce the jet of fluid comprises a passage passing through the datum element to a point adjacent its end.

8. A numerically-controlled machine tool as claimed in claim 5 wherein the male end of the datum element has a rounded tip.

9. A numerically-controlled machine tool as claimed in claim 8 wherein the rounded tip of the datum element is constituted by a spherical ball retained in the end of the remainder of the datum element.

10. Apparatus for positioning a cutting tool in a tool-holding member, comprising; a pallet for use in a numerically-controlled machine tool and to which a workpiece to be machined in the machine tool can be fixed, the machine tool having a cutting tool-holding member, the pallet having mounted therein a datum element having a male end which can abut a datum surface on a cutting tool in the tool-holding member to enable the cutting tool to be positioned in the tool-holding member, said datum surface on the tool being a predetermined distance from the cutting edge of the tool.

11. Apparatus as claimed in claim 10 wherein the male end of the datum element has a rounded tip.

12. Apparatus as claimed in claim 11 wherein the rounded tip of the datum element is constituted by a spherical ball retained in the end of the remainder of the datum element.

13. Apparatus as claimed in claim 10 further comprising means to produce a jet of fluid to remove foreign matter from the end of the datum element and from the datum element on the tool.

14. Apparatus as claimed in claim 13 wherein the means to produce a jet of fluid comprises a passage passing through the datum element to adjacent a point at its end and a plurality of passages passing through the pallet adjacent to the datum element.

15. A numerically-controlled machine tool comprising, at least one cutting tool having a datum surface at a predetermined distance from the cutting edge of the tool, a cutting tool-holding member, tool-gripping means associated with said member and operable to close onto and grip the shank of a cutting tool after the cutting tool has been positioned in the tool-holding member, a datum element having a male end, said tool-holding member being movable towards said datum element to a predetermined distance therefrom so that the male end of the datum element can abut said datum surface on said cutting tool and move the tool relative to the tool-holding member whereby the tool is positioned in the tool-holding member with its cutting edge a predetermined distance from the end of the tool-holding member.

16. A numerically-controlled machine tool as claimed in claim 15 wherein the datum surface of said cutting tool is recessed with respect to the cutting edge of the tool.

References Cited

UNITED STATES PATENTS

| | | | |
|---|---|---|---|
| 2,129,418 | 9/1938 | Gase | 29—103.1 |
| 2,898,685 | 8/1959 | Nordquist et al. | |
| 3,241,451 | 3/1966 | Williamson | 90—11 |

GIL WEIDENFELD, Primary Examiner

U.S. Cl. X.R.

33—185; 77—55; 29—103